US 7,603,370 B2

(12) United States Patent
Manasse

(10) Patent No.: US 7,603,370 B2
(45) Date of Patent: Oct. 13, 2009

(54) METHOD FOR DUPLICATE DETECTION AND SUPPRESSION

(75) Inventor: Mark S. Manasse, San Francisco, CA (US)

(73) Assignee: Microsoft Corporation, Redmond, WA (US)

(*) Notice: Subject to any disclaimer, the term of this patent is extended or adjusted under 35 U.S.C. 154(b) by 451 days.

(21) Appl. No.: 10/805,805

(22) Filed: Mar. 22, 2004

(65) Prior Publication Data
US 2005/0210043 A1 Sep. 22, 2005

(51) Int. Cl.
G06F 7/00 (2006.01)
G06F 17/30 (2006.01)
G06F 17/00 (2006.01)

(52) U.S. Cl. .................. 707/101; 707/102; 707/6; 707/3

(58) Field of Classification Search .................. 707/1, 707/5, 3, 6, 100–102
See application file for complete search history.

(56) References Cited

U.S. PATENT DOCUMENTS

| | | | | |
|---|---|---|---|---|
| 5,721,788 A * | 2/1998 | Powell et al. | ............... | 382/100 |
| 5,909,677 A | 6/1999 | Broder et al. | | |
| 5,974,481 A | 10/1999 | Broder | | |
| 6,058,410 A * | 5/2000 | Sharangpani | ............... | 708/551 |
| 6,119,124 A * | 9/2000 | Broder et al. | ........... | 707/103 R |
| 6,269,362 B1 | 7/2001 | Broder et al. | | |
| 6,349,296 B1 * | 2/2002 | Broder et al. | .................. | 707/3 |
| 6,658,423 B1 * | 12/2003 | Pugh et al. | .................. | 707/102 |

OTHER PUBLICATIONS

Manasse, Mark et al., "On the Evolution of Clusters of Near-Duplicate Web Pages" Nov. 1, 2003, IEEE Computer Society, p. 1-9.*

Broder. "On the Resemblance and Containment of Documents," in *Proc. Compression and Complexity of Sequences*, 1997, pp. 21-29 (Los Alamitos, Calif.: IEEE Computer Society, 1998).

Broder et al. "Syntactic Clustering of the Web," in *Proc. 6th Intl. World Wide Web Conf.*, 1997, pp. 391-404. Available: http://decweb.ethz.ch/WWW6/Technical/Paper205/Paper205.html (Mar. 22, 2004).

Manasse. "Finding Similar Things Quickly in Large Collections." Available: http://research.microsoft.com/research/sv/PageTurner/similarity.htm (Mar. 22, 2004). Includes hypertext link to the following URL at which shingleprinting source code for estimating document similarity (version 1.0) may be downloaded upon acceptance of Microsoft Research End User License Agreement: http://research.microsoft.com/research/downloads/download.aspx?FUID={2EECAA76-45DO-494C-B712-A7A30CCE89E9}.

U.S. Appl. No. 09/960,583, filed Sep. 21, 2001, Manasse et al.

U.S. Appl. No. 10/055,586, filed Jan. 22, 2002, Bar-Yossef et al.

* cited by examiner

*Primary Examiner*—Etienne P LeRoux
*Assistant Examiner*—Brent Stace
(74) *Attorney, Agent, or Firm*—Woodcock Washburn LLP

(57) ABSTRACT

A method detects similar objects in a collection of such objects by modification of a previous method in such a way that per-object memory requirements are reduced while false detections are avoided approximately as well as in the previous method. The modification includes (i) combining k samples of features into s supersamples, the value of k being reduced from the corresponding value used in the previous method; (ii) recording each supersample to b bits of precision, the value of b being reduced from the corresponding value used in the previous method; and (iii) requiring l matching supersamples in order to conclude that the two objects are sufficiently similar, the value of l being greater than the corresponding value required in the previous method. One application of the invention is in association with a web search engine query service to determine clusters of query results that are near-duplicate documents.

15 Claims, 4 Drawing Sheets

METHOD FOR DUPLICATE DETECTION AND SUPPRESSION

TECHNICAL FIELD OF THE INVENTION

The present invention relates to identifying similar data objects in large collections, and more particularly to identifying near-duplicates in very large corpora of documents, such as the World Wide Web.

BACKGROUND OF THE INVENTION

Large collections of documents typically include many documents that are identical to or nearly identical to one another. Determining whether two digitally-encoded documents are bit-for-bit identical is easy (using hashing techniques, for example). Quickly identifying documents that are roughly or effectively identical, however, is a more challenging and, in many contexts, a more useful task. The World Wide Web is an extremely large set of documents. The Web having grown exponentially since its birth, Web indexes currently include approximately five billion web pages (the static Web being estimated at twenty billion pages), a significant portion of which are duplicates and near-duplicates. Applications such as web crawlers and search engines benefit from the capacity to detect near-duplicates. For example, it may be desirable to have such applications ignore most duplicates and near-duplicates, or to filter the results of a query so that similar documents are grouped together.

"Shingling" or "shingleprinting" techniques have been developed to address the problem of finding similar objects in large collections. Various aspects of such techniques are described in the following patent references: U.S. Pat. No. 5,909,677, Broder et al., "Method for Determining the Resemblance of Documents," filed on Jun. 18, 1996; U.S. Pat. No. 5,974,481, Broder, "Method for Estimating the Probability of Collisions of Fingerprints," filed on Sep. 15, 1997; U.S. Pat. No. 6,269,362, Broder et al., "System and Method for Monitoring Web Pages by Comparing Generated Abstracts," filed on Dec. 19, 1997, in which the inventor of the present application is a co-inventor; U.S. Pat. No. 6,119,124, Broder et al., "Method for Clustering Closely Resembling Data Objects," filed on Mar. 26, 1998, in which the inventor of the present application is a co-inventor; U.S. Pat. No. 6,349,296, Broder et al., "Method for Clustering Closely Resembling Data Objects," filed on Aug. 21, 2000, in which the inventor of the present application is a co-inventor; and U.S. patent application Ser. No. 09/960,583, Manasse et al., "System and Method for Determining Likely Identity in a Biometric Database", filed on Sep. 21, 2001 and published on Mar. 27, 2003, in which the inventor of the present application is a co-inventor. See also Broder, "On the Resemblance and Containment of Documents," 1997 Proc. Compression & Complexity of Sequences 21-29 (IEEE 1998); Broder, Glassman, Manasse, and Zweig, "Syntactic Clustering of the Web," Proc. 6th Intl. World Wide Web Conf. 391-404 (April 1997); Manasse, "Finding Similar Things Quickly in Large Collections, "<http://research.microsoft.com/research/sv/PageTurner/similarity.htm>(2004). Each of these patent and non-patent references is incorporated herein by reference.

In the shingling approach, a document is reduced to a set of features that are sufficiently representative of the document, so that two very similar documents will share a large number of features. For a text-content document, it has proved useful to extract as features the set of overlapping contiguous w-word subphrases (its "w-shingling"), where w is a fixed number. Letting $D_1$ and $D_2$ be documents, and $F_1$ and $F_2$ their respective sets of features, we define the similarity of $D_1$ and $D_2$ to be the Jaccard coefficient of the feature sets, $$Sim(D_1, D_2) = \frac{|F_1 \cap F_2|}{|F_1 \cup F_2|}$$

(that is, the number of common features in the two documents, divided by the total number of features in the two documents). This gives a number between 0 and 1; the similarity of two essentially-equivalent documents will be a number close to one, while the similarity for most pairs of dissimilar documents will be a number close to zero. It should be noted that shingling techniques for detecting effectively-identical items in large collections are not restricted to text corpora. Shingling may be applied to collections of any sort of data object, such as sound recordings or visual images, for which it is possible to extract a set of representative features.

The number of features extracted from each document is potentially quite large (as large as the number of words in the document). If it is assumed that the document collection is itself very large (perhaps billions, as in the case of the Web), computing similarity values exactly and performing pairwise comparison is quadratic in the size of the collection, which is prohibitively expensive. Similarity is therefore approximated in order to reduce the problem to one of manageable size.

The approximation involves sampling the feature set of each document in a way that preserves document similarity. In principle, one can use a random one-to-one function from the space of features to a well-ordered set larger than the set of all features. By well-orderedness, there is a smallest element of the image of the feature set under the random function. The pre-image of the smallest element is taken as the chosen sample feature. This works because all functions are equally probable. Any element of a set is as likely to be mapped to the smallest element, and, when choosing from two sets, the smallest element is uniformly chosen from the union.

The foregoing scheme must be altered in order for it to be practically implementable. First, to pick uniformly, it is convenient to make the image set a finite set of integers. If the feature set is unbounded, it is difficult to get a one-to-one function to a finite set. Using a well-selected hash function, preferably Rabin fingerprints, to hash each feature into a number with a fixed number of bits, a set can be chosen that is large enough that the probability of collisions across the set is vanishingly small. Second, instead of picking a truly random function, the function is chosen from a smaller, easily parameterized set of functions, where the chosen function is provably good enough to get arbitrarily close to the correct probability. Typically, a combination of linear congruential permutations is used along with Rabin fingerprints, although this is not provably correct.

The technique provides a mechanism for selecting one feature $f_i$ from each feature set $F_i$ such that $Prob(f_i=f_j)=Sim(D_i,D_j)$. This selection mechanism provides unbiased point estimators for similarity. Some number r of selectors is chosen. For each document $D_i$, $f_i^1, \ldots, f_i^r$ is computed, using each selector once on $D_i$. At the cost of some preprocessing, this reduces the data storage for each item to a constant, and reduces comparison of sets to matching terms in vectors.

By running multiple independent selection mechanisms, an estimate of the percentage of similarity of two documents is obtained by counting matches in the vectors of selections. If p=Sim(D,E) then each term in the vectors for D and E match with probability p. The probability of matching k terms in a row is $p^k$. The vectors can be compressed by hashing non-overlapping runs of k items to single integers chosen from a large enough space that the probability of collisions in the hash values is negligible, while reducing storage needs by a factor of k. If there are s groups ("supersamples") of length k, the probability of one or more supersamples matching is $1-(1-p^k)^s$ and the probability of two or more supersamples matching is $1-(1-p^k)^s-s(1-p^k)^{s-1}$.

In previous work relating to the Alta Vista search engine, the 6-shingling of a normalized version of the text of each document was extracted as the feature set. Features were represented as 64-bit integers. The technique of using linear congruential permutations was applied to each 64-bit integer, producing a new set of 64-bit integers, and the pre-image of the smallest value in the new set was chosen as a sample. 84 samples were taken, divided into six supersamples combining fourteen samples each. Thus, for the parameters k and s, the values k=14 and s=6 were used. These parameter choices were made because the desired similarity threshold for near-duplicate documents was 0.95. The probability of fourteen samples matching between two documents is equal to the similarity of the documents raised to the fourteenth power, so that if the documents are near-duplicates, the probability will be $0.95^{14}$, which is approximately one-half. With six groups of fourteen samples, it is therefore likely that at least two groups out of the six will match, and it is unlikely that fewer than two groups will be a match. Thus, to decide that the documents were probably near-duplicates, two out of six supersamples were required to match. The previous work was effective in practice in identifying near-duplicate items in accordance with the desired threshold.

In the previous work it was found that the matching process could be simplified to a small number of hash table lookups per item. The k samples in a group are compressed into a 64-bit integer. As is explained further below, each supersample is recorded with 64-bit precision in order to avoid accidental agreement with dissimilar documents. All $$\binom{s}{2} = 15$$

the possible pairs of the s 64-bit integers are then inserted into hash tables. If s=6, for example, finding items that match at least two runs requires only lookups, so 15 hash tables are used.

The previous work was focused on the use of an offline process, so economizing main memory was not a primary concern. The hashing optimization described in the previous paragraph, for example, is well-suited to offline processing. The per-document storage requirements of this technique is unacceptable, however, for a search engine that performs it "on the fly" for all the documents. In a five-billion document collection, this would entail a memory footprint of 240 gigabytes to store 6 values, and an additional 520 gigabytes to store the hash-tables. This would be unwieldy at search execution and imposes constraints on index construction. For example, a search engine may perform no preprocessing pass on the full document collection and may incrementally build its index. It may be desirable for the search engine to determine, in an online process, which query results about to be reported are near-duplicates so that the reporting can be reduced to a single document per near-duplicate cluster, using a ranking function to choose that document, which allows the most responsive document to be chosen dynamically.

SUMMARY OF THE INVENTION

In accordance with certain embodiments, the invention provides a method for detecting similar objects in a collection of such objects. The method includes the modification of a previous method in such a way that per-object memory requirements are reduced while false detections are avoided approximately as well as in the previous method. The modification includes (i) combining k samples of features into s supersamples, the value of k being reduced from the corresponding value used in the previous method; (ii) recording each supersample to b bits of precision, the value of b being reduced from the corresponding value used in the previous method; and (iii) requiring l matching supersamples in order to conclude that the two objects are sufficiently similar, the value of l being greater than the corresponding value required in the previous method. The value of l in the current method may be, for example, s, s−1, or s−2.

In accordance with one embodiment, k=4, reduced from k=14 in a previous method. In accordance with an embodiment, b=16, reduced from b=64 in a previous method, and four of six supersamples are required to match, increased from a requirement of two of six in the previous method. In another embodiment, five of seven supersamples are required to match in place of two of six in the previous method. In yet another embodiment, all supersamples, and thus all samples, are required to match.

In some embodiments of the invention, the method is used in association with a web search engine query service to determine clusters of query results that are near-duplicate documents. Once the method is used to find these clusters, a single document from each cluster is selected, for example in accordance with a ranking function, and the single document (and a reference to similar documents) rather than the entire cluster is reported to the query submitter.

It is contemplated that the present invention may be implemented in whole or in part in software for execution on a computer.

Other features of the invention will become apparent from the following description when taken in conjunction with the drawings, in which:

DETAILED DESCRIPTION

In the following description, certain embodiments of the present invention will be described. For purposes of explanation, specific configurations and details are set forth in order to provide an understanding of the embodiments. However, it will also be apparent to one skilled in the art that the present invention may be practiced without the specific details. Furthermore, well-known features inherently a part of the invention and rudimentary to those having skill in the art are generally omitted or simplified in order not to obscure the embodiment being described.

The present invention provides a technique that identifies near-duplicate items in large collections approximately as well as the method of the previous work, but with a reduction in memory requirements per document. This makes the technique practicable and useful in situations where an offline process is not desired or cannot be used, or other situations in which particular memory constraints are present, as in the search engine example described at the end of the background section.

Figure 1:
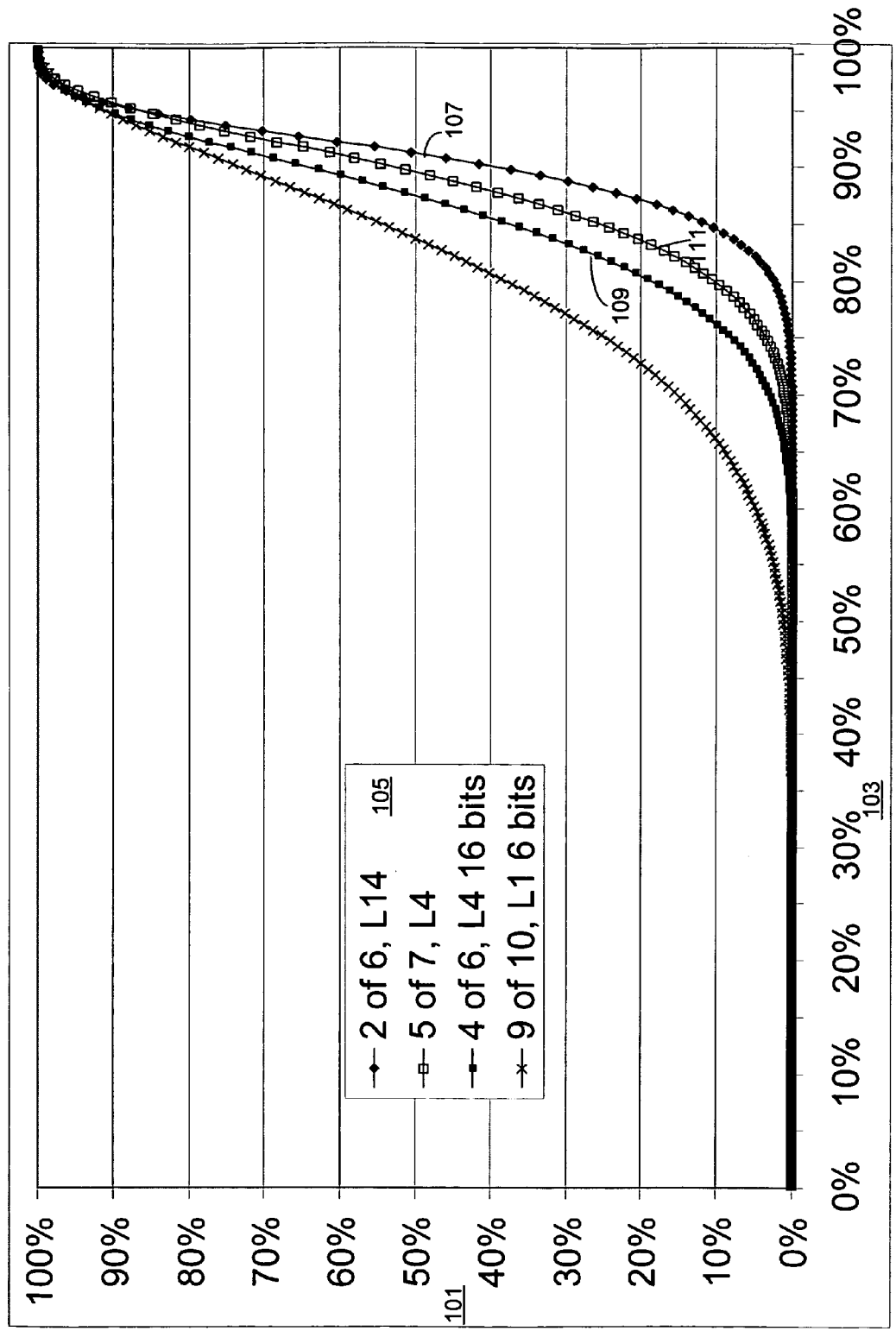
FIG. 1 is a graph that shows the probability of accepting documents using a shingleprinting method, for several different parameter choices, including parameters usable in embodiments of the present invention.

FIG. 1 is a graph that shows the probability of accepting documents 101 when applying the shingleprinting method with different parameter values, with underlying similarity 103 displayed on the x-axis. The notation in the legend 105 indicates the number of supersamples required to match out of the total number of supersamples available. The Lk notation indicates that each supersample combines k samples. The rightmost curve 107 (given as "2 of 6, L14") plots the results for the parameters applied in the previous work, as described above in the background section. This curve closely approximates a step function, illustrating the benefit of the existing approach in the likelihood of identifying near-duplicates at the 95% level.

As was noted above in the background section, in the previous work on near-duplicates in web search engine query results, each of the six supersamples, of which two matches are required, is 64 bits long. 128 bits of accuracy for the combined required matches is necessary in order to guarantee against false collisions due to the birthday paradox, according to which, in a collection of n items, a collision is likely to occur after only $\sqrt{n}$ items. With only 64 bits of accuracy, the process would be vulnerable to birthday paradox effects after examining $2^{32}$ pairs of items for similarity. For a document collection as large as the entire Web (several billion documents, as noted above), false collisions would therefore be virtually guaranteed. Therefore, with 64-bit supersamples, two matches out of six are necessary, and storage of all six supersamples is necessary. For five billion documents, such storage requirements clearly become substantial and impractical for many web search-related applications.

The present invention embodies the insight that the aggregate power of discrimination in the previous work is adequately approximated with a significant reduction in storage requirements. Fewer samples are combined into each supersample, and a greater number of matches out of the set of supersamples is required. In some embodiments, all but one or two of the supersamples are required to match. In another embodiment, all supersamples, and thus all samples, are required to match. Each supersample is reduced in bit precision while still avoiding birthday paradox collisions. The invention provides a way of modifying existing specific techniques for detecting similarity in particular large collections in order to achieve memory usage economies, in addition to providing new specific techniques for such collections.

Figure 3:
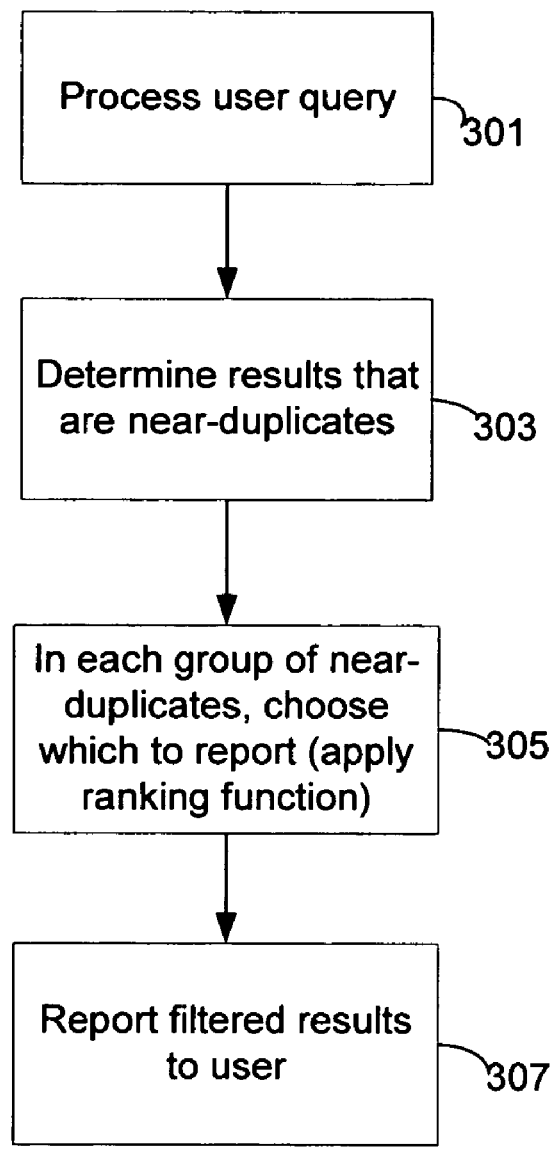
FIG. 3 is a flow diagram showing steps performed by a web search engine query service in an embodiment of the present invention.

In one embodiment, a technique for determining near-duplicates of documents is used in association with a web search engine query service processing the results of a user query, so that only one of each set of near-duplicates is reported to the user. FIG. 3 shows an exemplary process for such a query service. At step 301 the query is processed and a result set produced. At step 303 the method for determining clusters of results that are near-duplicates is applied. At step 305, for each cluster of near-duplicates, a ranking function is applied to determine a valued result. At step 307 the filtered query results are reported to the user.

In this embodiment, four out of six supersamples are required to match, rather than two out of six as in the previous work. Each supersample is only 16 bits long. 16 bits is adequate because, with four required matches, the number of bits in each contributes to the probability of avoiding false collisions. Moreover, in this embodiment, the entire web is generally not being searched; only the results of one query are in contention at a particular time, which is more likely to involve a number of documents in the tens or hundreds of thousands, rather than several billion. Therefore, 128 bits should not be necessary to avoid the effects of the birthday paradox (unless perhaps the search engine user asks a null query); 64 bits are likely to be sufficient. Each supersample combines four samples compressed into a 16-bit number, rather than fourteen samples compressed into a 64-bit number, since the probability of having four matches out of six, each of which has probability of one-half, is relatively small. The bit precision reduction allows memory requirements to be reduced by a factor of about four. Further reduction is possible because in-memory hash tables are constructed for the set of returned documents to a query, so only six values are needed for the full set of documents, not all fifteen.

Figure 4:
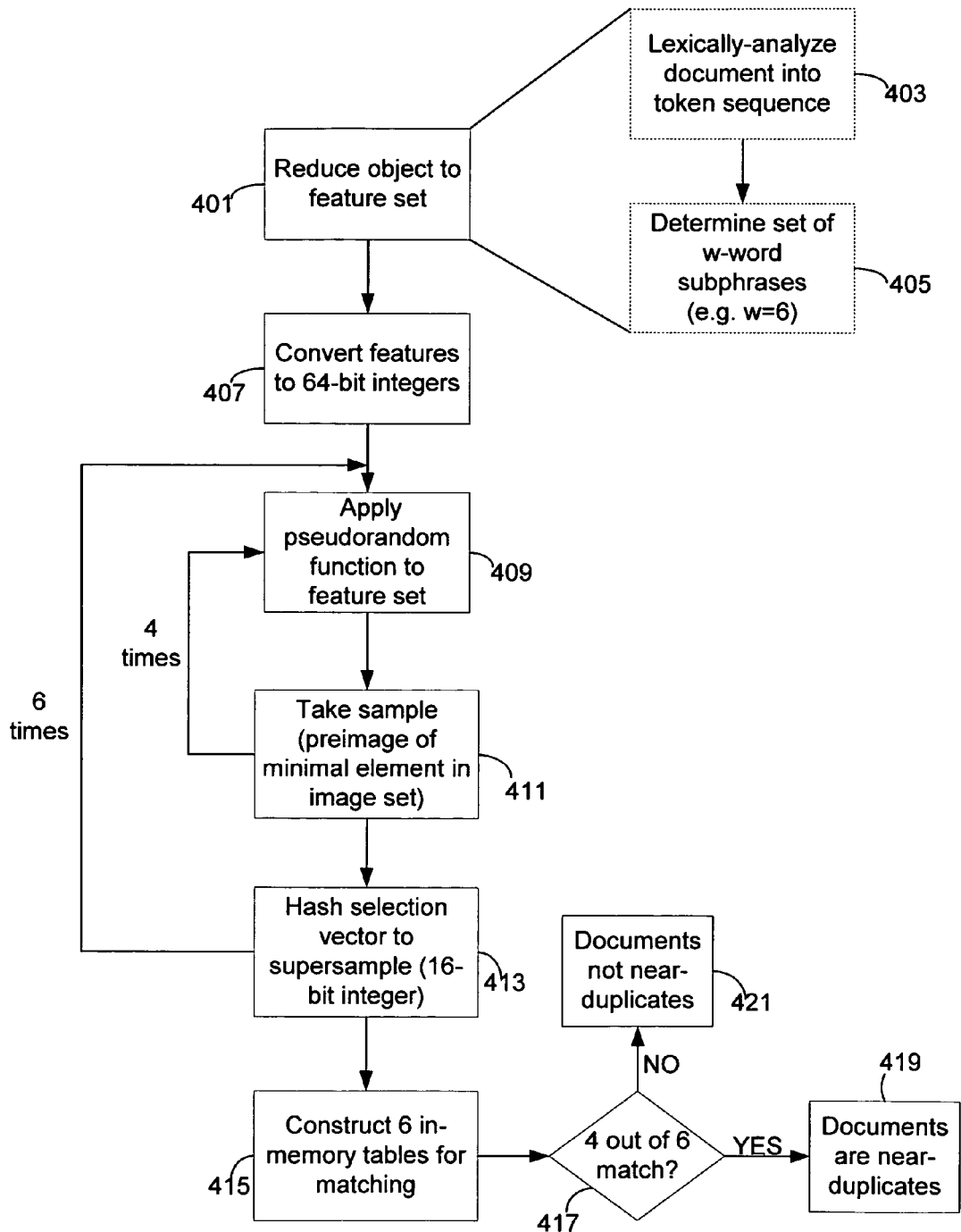
FIG. 4 shows exemplary steps for a method for determining whether documents are near-duplicates in accordance with an embodiment of the present invention.

FIG. 4 shows representative steps for a method for determining whether documents are near-duplicates in accordance with the embodiment of the invention described above. At step 401 the document or other object is reduced to a set of features. For a text-based document, such as searchable documents on the Web, the shingling approach may be used. At step 403 document is lexically analyzed into a sequence of tokens, ignoring features like punctuation and capitalization. At step 405 the set of contiguous fixed-word-size subphrases is determined.

At step 407 the features are converted to 64-bit integers. At step 409 a pseudorandom function is applied to the converted feature set, and at step 411 a sample is selected by taking the preimage of the minimal element of the image set. Steps 409 and 411 are performed k=4 times. At step 413 the resultant selection vector is hashed into a supersample recorded at 16-bit precision. The subprocess is repeated so that six supersamples are generated. At step 415 six in-memory tables are constructed for matching. If 4 out of 6 supersamples match (step 417), the documents being compared are determined to be near-duplicates (step 419), and otherwise are not near-duplicates (step 421). Efficient implementation of steps 415 and 417 is preferably done with 15 hash tables storing the combinations of four supersamples.

The false positive rate of asking for l matches out of s, where each supersample $$2^{66-bl}\binom{s}{l}$$

has bit length b, is $$\frac{\binom{s}{l}}{2^{bl}}.$$

The expected number of false positives in a collection of $2^{33}$ documents is. For l=4, s=6, and b=16, this results in 60 clusters of documents out of the entire collection falsely identified as duplicates; this will be observed only when two such clusters are represented in the result set of a single query. If it is hypothesized that no query returns more than $2^{10}$ clusters, then approximately a trillion queries can be expected to be processed before a false collision is encountered. If the query rate supported by the search engine is postulated to be about $2^{35}$ queries per year, then a false collision would occur two or three times per century, assuming the query service were running at full speed all the time and assuming that all queries had maximal result sets.

Turning again to FIG. 1, curve 109, given as "4 of 6, L4 16 bits," corresponds to the embodiment described above. The "16 bits" signifies that each supersample is recorded to 16 bits of precision. It can be seen that curve 109 is not quite as steep as curve 107. A somewhat better approximation to curve 107 is achieved by curve 111, given as "5 of 7, L4" (signifying five out of seven matching supersamples, each supersample combining four samples). An alternative embodiment of the search engine application described in the previous paragraph uses this 5 of 7 solution. Although not depicted, 4 of 6, L5 is also a good approximation.

Figure 2:
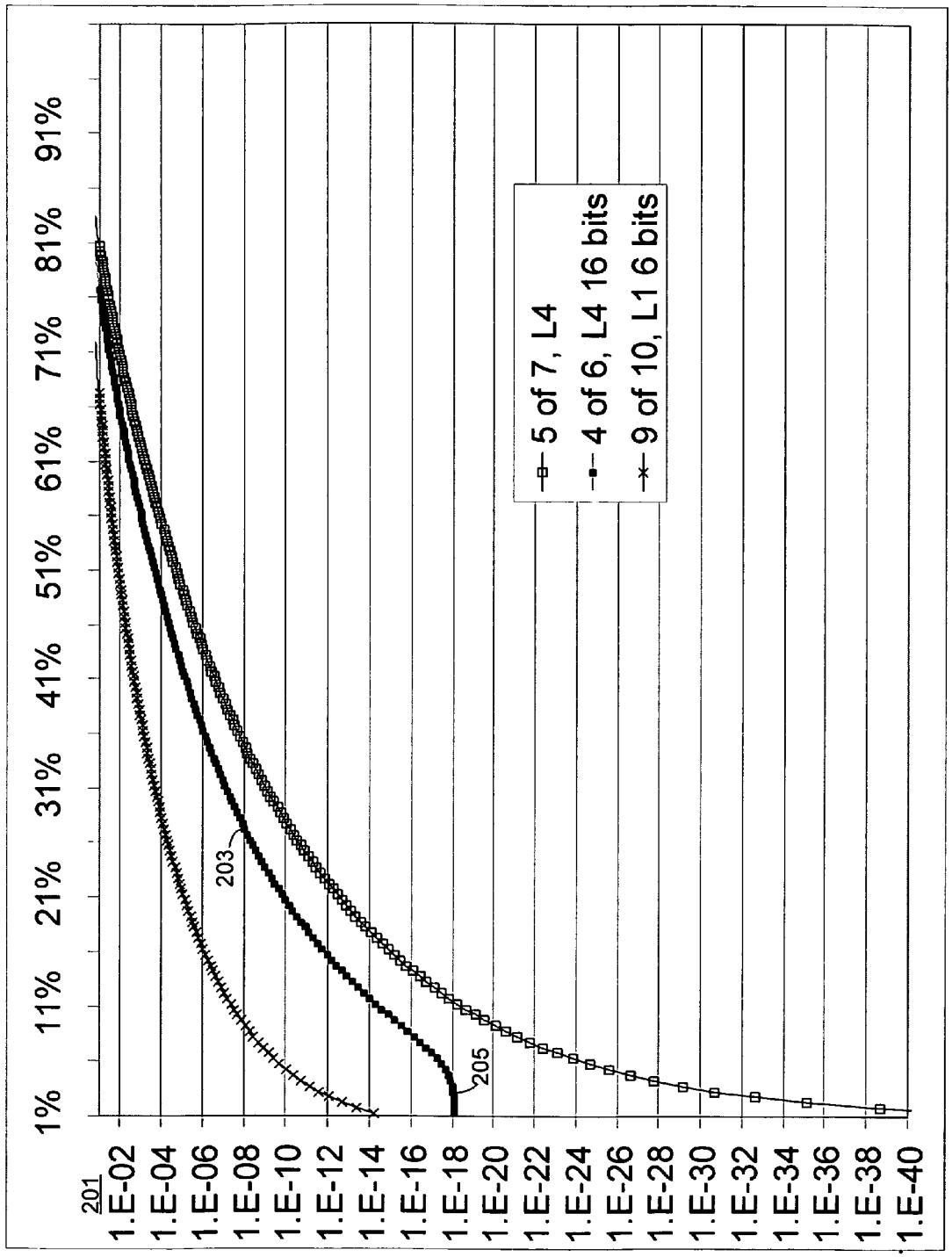
FIG. 2 is a graph of the false acceptance rate, based on taking logarithms of values plotted in FIG. 1.

Turning to FIG. 2, there is shown a graph of the false acceptance rate 201, based on taking logarithms of values plotted in FIG. 1. The plotted curves here reflect both the underlying combinatorics and the level of precision embedded in each sample. The graph shows in general that as similarity falls, the probability of misidentifying pairs of documents as near-duplicates becomes very small. The left end of curve 203 for "4 of 6, L4 16 bits," levels off at $10^{-18}$ (lead line 205) signifying the limit associated with 16-bit precision for samples. For the embodiment described above, however, this is satisfactory, with a negligible probability of false collisions.

Other variations are within the spirit of the present invention. Thus, while the invention is susceptible to various modifications and alternative constructions, a certain illustrated embodiment thereof is shown in the drawings and has been described above. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

Preferred embodiments of this invention are described herein, including the best mode known to the inventor for carrying out the invention. Variations of those preferred embodiments may become apparent to those of ordinary skill in the art upon reading the foregoing description. The inventor expects skilled artisans to employ such variations as appropriate, and the inventor intends for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method for detecting similar objects in a collection of such objects, the method comprising:
   processing, by a computer processor, a query to produce the collection of objects;
   constructing a plurality of has tables collecting objects produced by processing the query; and, for each of two objects:
   modifying a previous method for detecting similar objects so that memory requirements are reduced while avoiding false detections approximately as well as in the previous method, wherein the modifying comprises:
   combining. by the computer processor, four samples of features into seven supersamples;
   compressing each of the seven supersamples into sixteen bits of precision;
   constructing fifteen hash tables storing combinations of the supersamples;
   comparing the supersamples using the fifteen hash tables; and
   requiring a number of matching supersamples out of the seven supersamples in order to concluded that the two objects are sufficiently similar, wherein the number of matching supersamples is greater than a number of matching supersamples required in the previous method.

2. The method of claim 1, wherein requiring the number of matching supersamples comprises requiring at least six of the seven supersamples to match.

3. The method of claim 1, wherein requiring the number of matching supersamples comprises requiring at least five of the seven supersamples to match.

4. The method of claim 1, wherein requiring the number of matching supersamples comprises requiring all seven supersamples to match.

5. The method of claim 1, wherein the objects are documents, and the method is used in association with a search engine query service to determine clusters of query results that are near-duplicate documents.

6. The method of claim 5, further comprising selecting a single document in each cluster to report.

7. The method of claim 6, wherein selecting the single document is by way of a ranking function.

8. A method for determining groups of near-duplicate items in a search engine query result, the method comprising constructing a plurality of hash tables collecting items in the search engine query result and, for each of two items being compared:
   combining, by a computer processor, four samples of features into each of seven supersamples;
   compressing, by the computer processor, each supersample into 16 bits of precision;
   constructing fifteen hash tables storing combinations of four supersamples;
   using the fifteen hash tables to compare the supersamples; and
   requiring five of the seven supersamples to match.

9. The method of claim 8, farther comprising selecting a single document in each cluster to report.

10. The method of claim 9, wherein selecting the single document is by way of a ranking function.

11. A computer-readable storage medium embodying machine instructions implementing a current method for detecting similar objects in a collection of such objects, wherein the current method comprises modification of a previous method for detecting similar objects so that memory requirements are reduced while avoiding false detections approximately as well as in the previous method, the current method comprising:
   processing a query to produce the collection of objects;
   constructing a plurality of hash tables of collecting objects produced by processing the query; and, for each of two objects, combining four samples of features into each of seven supersamples, and compressing each of the seven supersamples to sixteen bits of precision;

constructing fifteen hash tables storing combinations of the supersamples;

comparing the supersamples using the fifteen hash tables; and requiring a number of matching supersamples in order to conclude that the two objects are sufficiently similar, wherein the number of matching supersamples is greater than a number of matching supersamples required in the previous method.

12. The computer-readable storage medium of claim 11, wherein requiring the number of matching supersamples comprises requiring at least six of the seven supersamples to match.

13. The computer-readable storage medium of claim 11, wherein requiring the number of matching supersamples comprises requiring at least five of the seven supersamples to match.

14. The computer-readable storage medium of claim 11, wherein requiring the number of matching supersamples comprises requiring all seven supersamples to match.

15. A computer-readable storage medium embodying machine instructions implementing a method for determining groups of near-duplicate items in a search engine query result, the method comprising constructing a plurality of hash tables collecting items in the search engine query result and, for each of two items being compared:

combining four samples of features into each of seven supersamples;

compressing each supersample into 16 bits of precision;

constructing fifteen hash tables storing combinations of four supersamples;

using the fifteen hash tables to compare the supersamples; and requiring five of the seven supersamples to match.

\* \* \* \* \*

UNITED STATES PATENT AND TRADEMARK OFFICE
CERTIFICATE OF CORRECTION

PATENT NO. : 7,603,370 B2
APPLICATION NO. : 10/805805
DATED : October 13, 2009
INVENTOR(S) : Mark S. Manasse It is certified that error appears in the above-identified patent and that said Letters Patent is hereby corrected as shown below:

In the Claims:

In column 7, line 65, in Claim 1, delete "has" and insert -- hash --, therefor.

In column 8, line 6, in Claim 1, delete "combining." and insert -- combining, --, therefor.

In column 8, line 52, in Claim 9, delete "farther" and insert -- further --, therefor.

In column 8, line 65, in Claim 11, after "tables" delete "of".

Signed and Sealed this
First Day of February, 2011

David J. Kappos
*Director of the United States Patent and Trademark Office*